United States Patent
Zhang et al.

(10) Patent No.: US 10,716,140 B2
(45) Date of Patent: Jul. 14, 2020

(54) TERMINAL ACCESS METHOD, AND APPARATUS

(71) Applicant: HUAWEI TECHNOLOGIES CO., LTD., Shenzhen (CN)

(72) Inventors: Zhaoyang Zhang, Hangzhou (CN); Xianbin Wang, Hangzhou (CN); Yu Zhang, Hangzhou (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 15/940,996

(22) Filed: Mar. 30, 2018

(65) Prior Publication Data
US 2018/0227951 A1 Aug. 9, 2018

Related U.S. Application Data

(63) Continuation of application No. PCT/CN2016/098759, filed on Sep. 12, 2016.

(30) Foreign Application Priority Data

Sep. 30, 2015 (CN) .......................... 2015 1 0642454

(51) Int. Cl.
*H04W 74/08* (2009.01)
*H04L 27/36* (2006.01)
(Continued)

(52) U.S. Cl.
CPC ............. *H04W 74/08* (2013.01); *H04L 27/36* (2013.01); *H04L 9/0869* (2013.01);
(Continued)

(58) Field of Classification Search
CPC ......... H04L 2027/0087; H04L 27/2675; H04L 29/08621; H04L 47/2483; H04L 67/146;
(Continued)

(56) References Cited

U.S. PATENT DOCUMENTS

2008/0316961 A1* 12/2008 Bertrand ............. H04W 74/004
370/329
2009/0196270 A1* 8/2009 Iwai ...................... H04W 74/08
370/342
(Continued)

FOREIGN PATENT DOCUMENTS

CN 101094027 A 12/2007
CN 103108338 A 5/2013
(Continued)

OTHER PUBLICATIONS

XP032694934, Mahmoud Taherzadeh et al.,"SCMA Codebook Design", 2014 IEEE 80th Vehicular Technology Conference (VTC2014-Fall), dated Sep. 14-17, 2014, total 5 pages.

*Primary Examiner* — Warner Wong
(74) *Attorney, Agent, or Firm* — Kilpatrick Townsend & Stockton LLP

(57) ABSTRACT

The present invention discloses a terminal access method and an apparatus, to resolve a problem in an existing SCMA multi-terminal access mechanism that a conflict causes system performance degradation and may cause system retransmission. The method is as follows: determining, by a terminal, to enter a contention-based access phase; and determining, by the terminal during each transmission of binary data, a first signature according to a random number seed and a signature matrix, and mapping, according to the first signature, the binary data to a multi-dimensional symbol for transmission, where first signatures used during different transmissions of binary data are different.

10 Claims, 7 Drawing Sheets

(51) Int. Cl.
    *H04L 27/00* (2006.01)
    *H04L 27/34* (2006.01)
    *H04L 9/08* (2006.01)
    *H04L 29/08* (2006.01)

(52) U.S. Cl.
    CPC .......... *H04L 27/0008* (2013.01); *H04L 27/34* (2013.01); *H04L 29/08621* (2013.01)

(58) Field of Classification Search
    CPC ... H04W 74/08; H04W 40/24; H04W 40/244; H04W 28/0294
    See application file for complete search history.

(56) References Cited

U.S. PATENT DOCUMENTS

| | | | | |
|---|---|---|---|---|
| 2011/0154488 | A1* | 6/2011 | Rajan | H04L 63/123 726/22 |
| 2014/0304810 | A1* | 10/2014 | Khanal | H04L 63/1466 726/22 |
| 2015/0043540 | A1* | 2/2015 | Nikopour | H04J 11/00 370/335 |
| 2015/0341950 | A1* | 11/2015 | Pang | H04W 72/1263 370/329 |

FOREIGN PATENT DOCUMENTS

| | | | | |
|---|---|---|---|---|
| EP | 2605467 A1 | 6/2013 | | |
| WO | 2005109653 A1 | 11/2005 | | |
| WO | WO2013/044970 | * | 4/2013 | ............ H04W 74/08 |
| WO | 2014135126 A1 | 9/2014 | | |

* cited by examiner

TERMINAL ACCESS METHOD, AND APPARATUS

CROSS-REFERENCE TO RELATED APPLICATIONS

This application is a continuation of International Patent Application PCT PCT/CN2016/098759, filed on Sep. 12, 2016, which claims priority to Patent Application No. 201510642454.3, filed on Sep. 30, 2015, the disclosures of which are incorporated herein by reference in their entireties.

TECHNICAL FIELD

The present invention relates to the field of communications technologies, and in particular, to a terminal access method and an apparatus.

BACKGROUND

As a third wave of world information industry development following computers and the Internet, the Internet of Things will change various aspects of humans, such as life, work, and production. The Internet of Things has rich connotations. The Internet of Vehicles, a smart household, a smart city, and the like that have recently drawn wide attention in the academic and industrial circles are all specific implementation forms of the Internet of Things. To implement the Internet of Things, a huge quantity of interconnected machine-type devices (machine-type devices) such as sensors and radio frequency identification tags need to be deployed. A cellular network is a simplest and most practical network architecture that can implement the Internet of Things.

To implement the Internet of Things or a wireless ad hoc network in the cellular network, cell densification will become a trend of a future network, and massive access (Massive Access) will become one of typical scenarios of the future network.

Characteristics of the massive access lie in:

Firstly, a quantity of potential access terminals is relatively large and dynamically changes.

Secondly, an access network structure is complex, a topology is variable, and a channel characteristic dynamically changes.

Thirdly, service types are complex; there may be distinct differences in data amounts for access of different terminals, possibly ranging from several bits to a large amount of data; and some real-time control networks have a relatively high requirement on a delay.

Characteristics of a scenario assumed for a conventional multiple access mechanism are: A quantity of terminals is small, but a data amount of each terminal is relatively large. These are obviously different from the characteristics of the massive access scenario. If the conventional multiple access mechanism is used for massive access, problems such as low efficiency, high signaling overheads, and high complexity are caused.

Based on this, in a current non-orthogonal access mechanism of sparse code multiple access (sparse code multiple access, SCMA), each signature in a low-density signature matrix is corresponding to L pilots, and a process of contention-based access is: A terminal first sends a pilot, where the pilot is randomly selected by the terminal, and then maps, by using a signature (Signature) corresponding to the pilot, data to a multi-dimensional symbol for data sending; and a base station first detects a pilot, and if a specific pilot is detected, this is equivalent to that a signature is detected, and the base station decodes received data according to the signature. In the current SCMA access mechanism, when different terminals happen to choose different pilots of a same signature, the base station can learn that the different terminals send data by using the same signature, and in this case, the base station can restore data by means of channel estimation of each terminal; or when different terminals choose a same pilot of a signature, due to a pilot conflict, the terminals execute a random backoff process to retransmit data.

SUMMARY

Embodiments of the present invention provide a terminal access method and an apparatus, to resolve a problem in an existing SCMA multi-terminal access mechanism that a conflict causes system performance degradation and may cause system retransmission.

Specific technical solutions provided in the embodiments of the present invention are as follows.

According to a first aspect, a terminal access method is provided, including:

determining, by a terminal, to enter a contention-based access phase; and determining, by the terminal during each transmission of binary data, a first signature according to a random number seed and a signature matrix, and mapping, according to the first signature, the binary data to a multi-dimensional symbol for transmission, where first signatures used during different transmissions of binary data are different.

With reference to the first aspect, in a first possible implementation, the determining, by the terminal, a first signature according to a random number seed and a signature matrix includes:

generating, by the terminal, a random number according to the random number seed, and randomly selecting a first signature from the signature matrix according to the random number.

With reference to the first aspect, in a second possible implementation, the determining, by the terminal, a first signature according to a random number seed and a signature matrix includes:

generating, by the terminal, a random number according to the random number seed, randomly selecting a plurality of second signatures from the signature matrix according to the random number, and combining the plurality of second signatures into the first signature.

With reference to any one of the first aspect to the second possible implementation, in a third possible implementation, different terminals are corresponding to different random number seeds.

With reference to any one of the first aspect to the second possible implementation, in a fourth possible implementation, after the mapping, by the terminal according to the first signature, the binary data to a multi-dimensional symbol for transmission, the method further includes:

if determining that an acknowledgment signal sent by a base station is received, determining, by the terminal, that contention-based access is successful, where the acknowledgment signal is used to indicate that the contention-based access is successful.

According to a second aspect, a terminal access method is provided, including:

receiving, by a base station in a contention-based access phase, symbol sequences sent for a plurality of consecutive times by a terminal;

sequentially detecting, by the base station, a third signature included in each symbol sequence to obtain a sequence of third signatures;

determining, by the base station according to a random number seed and a signature matrix of each terminal, a sequence of first signatures that is corresponding to each terminal; and determining, by the base station, a sequence of first signatures, in the sequence of first signatures that is corresponding to each terminal, that is the same as the sequence of third signatures; determining a terminal corresponding to the determined sequence of first signatures as a terminal sending the symbol sequences; and obtaining corresponding binary data by parsing, according to the sequence of third signatures, each symbol sequence of the determined terminal.

With reference to the second aspect, in a first possible implementation, the determining, by the base station according to a random number seed and a signature matrix of each terminal, a sequence of first signatures that is corresponding to each terminal, includes:

generating, by the base station, random numbers according to the random number seed of a terminal for a plurality of consecutive times, sequentially selecting a first signature from the signature matrix according to each random number, and determining, according to the first signature corresponding to each random number, the sequence of first signatures that is corresponding to the terminal.

With reference to the second aspect, in a second possible implementation, the determining, by the base station according to a random number seed and a signature matrix of a terminal, a sequence of first signatures that is corresponding to each terminal, includes:

generating, by the base station, random numbers according to the random number seed of a terminal for a plurality of consecutive times; sequentially selecting second signatures from the signature matrix according to each random number, where a plurality of second signatures are selected at a time; combining the plurality of second signatures selected at a time into a first signature; and determining, according to the first signature corresponding to each random number, the sequence of first signatures that is corresponding to the terminal.

With reference to any one of the second aspect to the second possible implementation, in a third possible implementation, the method further includes:

if successfully parsing the symbol sequences, feeding back, by the base station, an acknowledgment signal to the terminal corresponding to the symbol sequences, where the acknowledgment signal is used to indicate that contention-based access is successful.

According to a third aspect, a terminal is provided, including:

a determining module, configured to determine to enter a contention-based access phase; and a processing module, configured to: after the determining module determines to enter the contention-based access phase, during each transmission of binary data, determine a first signature according to a random number seed and a signature matrix, and map, according to the first signature, the binary data to a multi-dimensional symbol for transmission, where first signatures used during different transmissions of binary data are different.

With reference to the third aspect, in a first possible implementation, the processing module is specifically configured to:

generate a random number according to the random number seed, and randomly select a first signature from the signature matrix according to the random number.

With reference to the third aspect, in a second possible implementation, the processing module is specifically configured to:

generate a random number according to the random number seed, randomly select a plurality of second signatures from the signature matrix according to the random number, and combine the plurality of second signatures into the first signature.

With reference to any one of the third aspect to the second possible implementation, in a third possible implementation, the random number seed corresponding to the terminal is different from a random number seed corresponding to another terminal.

With reference to any one of the third aspect to the second possible implementation, in a fourth possible implementation, the processing module is further configured to:

after mapping, according to the first signature, the binary data to the multi-dimensional symbol for transmission, if determining that an acknowledgment signal sent by a base station is received, determine that contention-based access is successful, where the acknowledgment signal is used to indicate that the contention-based access is successful.

According to a fourth aspect, a base station is provided, including:

a receiving module, configured to receive, in a contention-based access phase, symbol sequences sent for a plurality of consecutive times by a terminal;

a detection module, configured to sequentially detect a third signature included in each symbol sequence received by the receiving module, to obtain a sequence of third signatures;

a determining module, configured to determine, according to a random number seed and a signature matrix of each terminal, a sequence of first signatures that is corresponding to each terminal; and a parsing module, configured to determine a sequence of first signatures, in the sequence of first signatures that is corresponding to each terminal and that is determined by the determining module, that is the same as the sequence of third signatures that is obtained by the detection module by means of detection; determine a terminal corresponding to the determined sequence of first signatures as a terminal sending the symbol sequences; and obtain corresponding binary data by parsing, according to the sequence of third signatures, each symbol sequence of the determined terminal.

With reference to the fourth aspect, in a first possible implementation, the determining module is specifically configured to:

generate random numbers according to the random number seed of the terminal for a plurality of consecutive times, sequentially select a first signature from the signature matrix according to each random number, and determine, according to the first signature corresponding to each random number, the sequence of first signatures that is corresponding to the terminal.

With reference to the fourth aspect, in a second possible implementation, the determining module is specifically configured to:

generate random numbers according to the random number seed of the terminal for a plurality of consecutive times; sequentially select second signatures from the signature matrix according to each random number, where a plurality of second signatures are selected at a time; combine the plurality of second signatures selected at a time into a first signature; and determine, according to the first signature corresponding to each random number, the sequence of first signatures that is corresponding to the terminal.

With reference to any one of the fourth aspect to the second possible implementation, in a third possible implementation, the base station further includes a sending module, configured to:

if the parsing module successfully parses the symbol sequences, feed back an acknowledgment signal to the terminal corresponding to the symbol sequences, where the acknowledgment signal is used to indicate that contention-based access is successful.

According to a fifth aspect, a terminal is provided, including a processor, a memory, and a transceiver. The transceiver receives and sends data under control of the processor. A preset program is stored in the memory. The processor reads the program stored in the memory and executes the following process according to the program:

determining to enter a contention-based access phase; and during each transmission of binary data, determining a first signature according to a random number seed and a signature matrix, and mapping, according to the first signature, the binary data to a multi-dimensional symbol for transmission, where first signatures used during different transmissions of binary data are different.

With reference to the fifth aspect, in a first possible implementation, the processor is specifically configured to:

generate a random number according to the random number seed, and randomly select a first signature from the signature matrix according to the random number.

With reference to the fifth aspect, in a second possible implementation, the processor is specifically configured to:

generate a random number according to the random number seed, randomly select a plurality of second signatures from the signature matrix according to the random number, and combine the plurality of second signatures into the first signature.

With reference to any one of the fifth aspect to the second possible implementation, in a third possible implementation, the random number seed corresponding to the terminal is different from a random number seed corresponding to another terminal.

With reference to any one of the fifth aspect to the second possible implementation, in a fourth possible implementation, the processor is further configured to:

after mapping, according to the first signature, the binary data to the multi-dimensional symbol for transmission, if determining that an acknowledgment signal sent by a base station is received, determine that contention-based access is successful, where the acknowledgment signal is used to indicate that the contention-based access is successful.

According to a sixth aspect, a base station is provided, including a processor, a memory, and a transceiver. The transceiver receives and sends data under control of the processor. A preset program is stored in the memory. The processor reads the program stored in the memory and executes the following process according to the program:

receiving, in a contention-based access phase, symbol sequences sent for a plurality of consecutive times by a terminal;

sequentially detecting a third signature included in each symbol sequence, to obtain a sequence of third signatures;

determining, according to a random number seed and a signature matrix of each terminal, a sequence of first signatures that is corresponding to each terminal; and determining a sequence of first signatures, in the sequence of first signatures that is corresponding to each terminal, that is the same as the sequence of third signatures, determining a terminal corresponding to the determined sequence of first signatures as a terminal sending the symbol sequences, and obtaining corresponding binary data by parsing, according to the sequence of third signatures, each symbol sequence of the determined terminal.

With reference to the sixth aspect, in a first possible implementation, the processor is specifically configured to:

generate random numbers according to the random number seed of the terminal for a plurality of consecutive times, sequentially select a first signature from the signature matrix according to each random number, and determine, according to the first signature corresponding to each random number, the sequence of first signatures that is corresponding to the terminal.

With reference to the sixth aspect, in a second possible implementation, the processor is specifically configured to:

generate random numbers according to the random number seed of the terminal for a plurality of consecutive times; sequentially select second signatures from the signature matrix according to each random number, where a plurality of second signatures are selected at a time; combine the plurality of second signatures selected at a time into a first signature; and determine, according to the first signature corresponding to each random number, the sequence of first signatures that is corresponding to the terminal.

With reference to any one of the sixth aspect to the second possible implementation, in a third possible implementation, the processor is specifically configured to:

if successfully parsing the symbol sequences, feed back, by using the transceiver, an acknowledgment signal to the terminal corresponding to the symbol sequences, where the acknowledgment signal is used to indicate that contention-based access is successful.

In the embodiments of the present invention, after entering the contention-based access phase, during each transmission of binary data, the terminal determines the first signature according to the random number seed and the signature matrix, and maps, according to the first signature, the binary data to the multi-dimensional symbol for transmission. In addition, first signatures used during different transmissions of binary data are different. This reduces a conflict probability, in existing SCMA, in a manner in which during each transmission of binary data, a terminal uses a fixed signature to map the binary data to a multi-dimensional symbol for transmission, so as to reduce a transmission delay and improve system efficiency. In addition, because the terminal changes a signature during each transmission of binary data, even if a transmission process of the terminal conflicts with that of another terminal, no random backoff process needs to be performed, and it is merely required that binary data continue to be transmitted, thereby further improving system efficiency.

DESCRIPTION OF EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
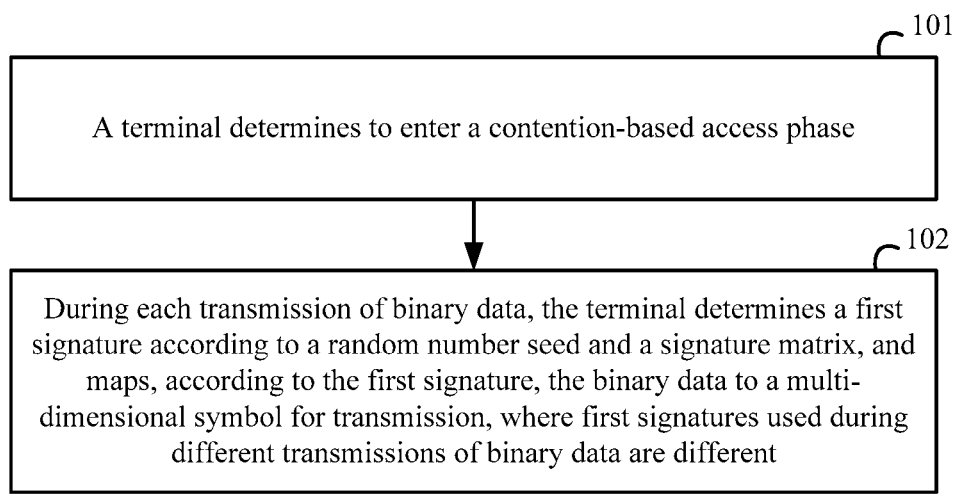
FIG. 1 is a schematic flowchart of a detailed method of terminal access according to an embodiment of the present invention.

In an embodiment of the present invention, as shown in FIG. 1, a detailed method process of terminal access is as follows.

Step 101. A terminal determines to enter a contention-based access phase.

During implementation, if receiving a start beacon (Beacon) broadcast by a base station, the terminal determines, according to the start beacon, to enter the contention-based access phase. The start beacon is used to instruct to enter the contention-based access phase.

During implementation, in a complete contention-based access process, the terminal sends, to the base station, aggregate binary data obtained by encoding data, and sequentially selects, during each transmission, a part of binary data from the aggregate binary data for transmission, for example, selects four bits from the aggregate binary data for transmission each time.

Step 102. During each transmission of binary data, the terminal determines a first signature according to a random number seed and a signature matrix, and maps, according to the first signature, the binary data to a multi-dimensional symbol for transmission, where first signatures used during different transmissions of binary data are different.

Different terminals are corresponding to different random number seeds.

Specifically, the random number seed of the terminal may be allocated by the base station, or may be agreed on by the terminal and the base station.

The signature matrix may be configured for each terminal by the base station, or may be agreed on by the terminal and the base station and pre-configured in the base station and the terminal. It should be noted that signature matrices configured for the base station and the terminal are the same. A column in the signature matrix is referred to as a signature. The signature matrix may be pre-determined by means of simulation or the like. A specific manner for obtaining the signature matrix is not limited in this embodiment of the present invention.

During implementation, the terminal generates a random number according to the random number seed, and selects a first signature from the signature matrix according to the random number; or the terminal generates a random number according to the random number seed, selects a plurality of second signatures from the signature matrix according to the random number, and combines the plurality of second signatures into a first signature.

A first signature is a signature determined according to a random number and a signature matrix.

A second signature is one of a plurality of signatures selected from the signature matrix according to the random number at a time.

Specifically, the terminal sequentially generates random numbers according to the random number seed and a random number generator. A different random number is generated each time. After generating a random number according to the random number seed and the random number generator, the terminal selects a first signature or a plurality of second signatures from the signature matrix according to the random number.

It should be noted that a manner for selecting a first signature or a plurality of second signatures from the signature matrix according to the random number is not limited in this embodiment of the present invention, provided that first signatures or pluralities of second signatures that are selected from the signature matrix according to different random numbers are different. Herein, that the selected second signatures are different indicates that quantities of second signatures selected from the signature matrix according to different random numbers are different, or second signatures selected from the signature matrix according to different random numbers are not all the same. An example is used below for description: Assuming that there are N columns in the signature matrix and a value range of a random number is from 0 to N/2, when a value of the random number is d, a $d^{th}$ column and a $(d+N/2)^{th}$ column in the signature matrix are selected, that is, two second signatures are selected. At least three second signatures may be selected from the signature matrix in a same manner by making a simple modification to the example.

During implementation, if selecting a plurality of second signatures from the signature matrix according to the random number at a time, the terminal combines the plurality of second signatures into a first signature, and maps, according to the first signature, the binary data to the multi-dimensional symbol for transmission. Specifically, the terminal combines, according to a preset rule, the plurality of second signatures selected from the signature matrix at a time into a first signature. There are various manners in which the terminal combines the plurality of second signatures selected at a time into a first signature. A specific combination manner is not limited in this embodiment of the present invention, that is, a specific form in which the preset rule is set is not limited. An example is used below for description: The terminal calculates, according to a preset weighed value, a weighed sum of the second signatures selected at a time, and an obtained result is determined as a first signature obtained after combination; or the terminal directly calculates a sum of the second signatures selected at a time, and an obtained result is determined as a first signature obtained after combination.

During implementation, after transmitting the binary data, if determining that an acknowledgment signal sent by the base station is received, where the acknowledgment signal is used to indicate that contention-based access is successful, the terminal does not transmit a next piece of binary data.

During implementation, the binary data transmitted by the terminal is obtained after data is encoded by the terminal. A specific used encoding manner includes but is not limited to algorithms such as turbo (Turbo) encoding and low-density parity-check (low-density parity-check code, LDPC) encoding.

During implementation, an example is used below for describing a specific process of mapping the binary data to the multi-dimensional symbol for transmission: Assuming that K bits are directly mapped to N-dimensional complex-value symbols, K0 complex-value symbols are not zero, N−K0 complex-value symbols are zero, and N-dimensional complex-value symbols of each terminal are superposed on N orthogonal (or approximately orthogonal) resource blocks, for example, the N-dimensional complex-value symbols of each terminal are superposed on N orthogonal frequency division multiplexing (Orthogonal Frequency Division Multiplexing, OFDM) frequency domain subcarriers or multiple-input multiple-output (Multiple-Input Multiple-Output, MIMO) spatial layers.

In this embodiment of the present invention, after entering the contention-based access phase, during each transmission of binary data, the terminal determines the first signature according to the random number seed and the signature matrix, and maps, according to the first signature, the binary data to the multi-dimensional symbol for transmission. In addition, first signatures used during different transmissions of binary data are different. This avoids a problem in existing SCMA that a conflict probability is relatively high because during each transmission of binary data, the terminal uses a fixed signature to perform mapping, so as to reduce a transmission delay and improve system efficiency. In addition, because the terminal changes a signature during each transmission of binary data, even if a transmission process of the terminal conflicts with that of another terminal, no random backoff process needs to be performed, and it is merely required that binary data continue to be transmitted, thereby further improving system efficiency.

Figure 2:
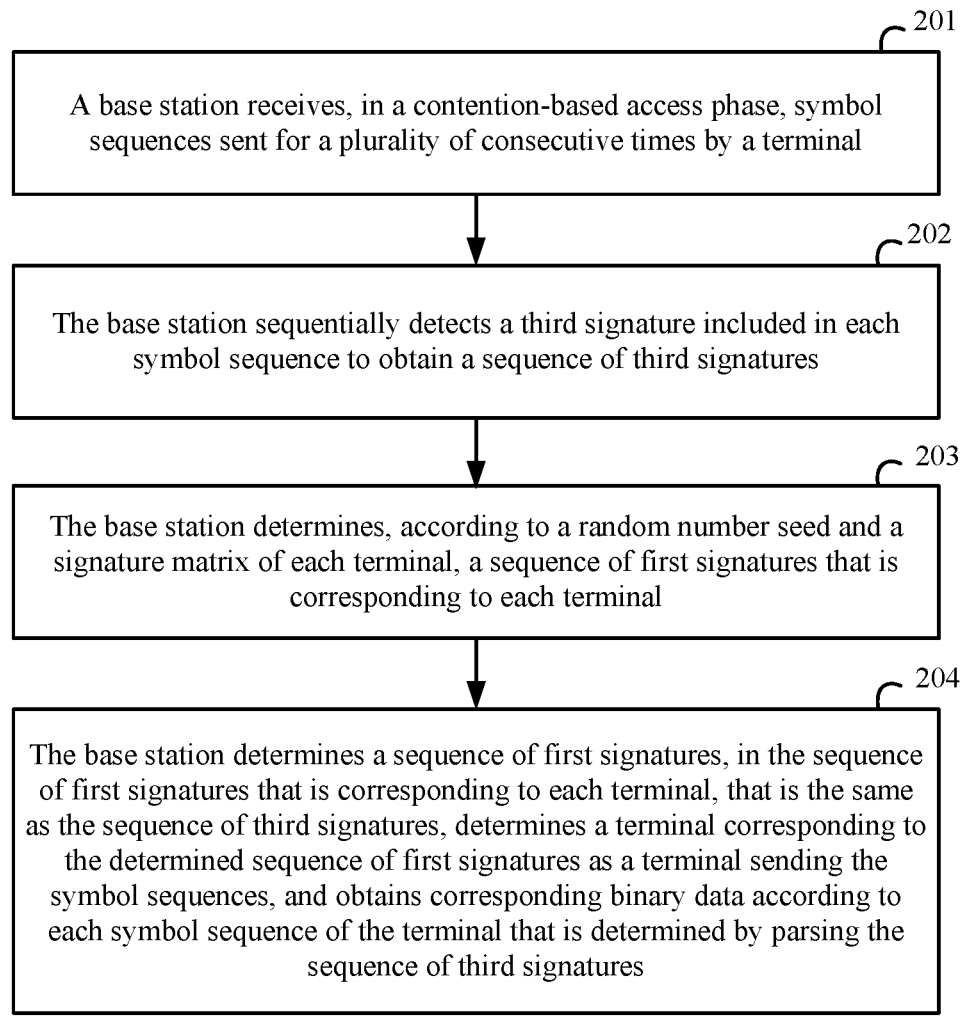
FIG. 2 is a schematic flowchart of a detailed method in which multiple terminals access a base station according to an embodiment of the present invention.

Based on a same inventive idea, in an embodiment of the present invention, as shown in FIG. 2, a detailed method process in which multiple terminals access a base station is as follows.

Step 201. A base station receives, in a contention-based access phase, symbol sequences sent for a plurality of consecutive times by a terminal.

During implementation, the base station broadcasts a start beacon before initiating the contention-based access phase. The start beacon instructs to enter the contention-based access phase.

Step 202. The base station sequentially detects a third signature included in each symbol sequence and obtains a sequence of third signatures.

The third signature is a signature directly carried in the symbol sequence received by the base station.

During implementation, the base station may identify the third signature included in the symbol sequence received by the base station by using an algorithm including but not limited to an energy detection algorithm and a detection algorithm based on channel estimation.

During implementation, in a contention-based access process, third signatures are arranged in the sequence of third signatures according to a sending order of the symbol sequences. Because random number seeds agreed on by different terminals and the base station are different, sequences of third signatures that are corresponding to different terminals are also different.

Step 203. The base station determines, according to a random number seed and a signature matrix of each terminal, a sequence of first signatures that is corresponding to each terminal.

A first signature is a signature determined according to a random number and a signature matrix.

A second signature is one of a plurality of signatures selected from the signature matrix according to the random number at a time.

The signature matrix may be configured for each terminal by the base station, or may be agreed on by the terminal and the base station and pre-configured in the base station and the terminal. It should be noted that signature matrices configured for the base station and the terminal are the same. A column in the signature matrix is referred to as a signature. The signature matrix may be pre-determined by means of simulation or the like. A specific manner for obtaining the signature matrix is not limited in this embodiment of the present invention.

Different terminals are corresponding to different random number seeds.

Specifically, the random number seed of the terminal may be allocated by the base station, or may be agreed on by the terminal and the base station.

In an optional implementation, for each terminal, the base station determines a sequence of first signatures that is corresponding to the terminal according to the following process: The base station generates random numbers according to a random number seed of the terminal for a plurality of consecutive times, sequentially selects a first signature from the signature matrix according to each random number, and determines, according to the first signature corresponding to each random number, the sequence of first signatures that is corresponding to the terminal.

In another optional implementation, for each terminal, the base station determines a sequence of first signatures that is corresponding to the terminal according to the following process: generating random numbers according to a random number seed of the terminal for a plurality of consecutive times; sequentially selecting second signatures from the signature matrix according to each random number, where a plurality of second signatures are selected at a time; combining the plurality of second signatures selected at a time into a first signature; and determining, according to the first signature corresponding to each random number, the sequence of first signatures that is corresponding to the terminal.

During implementation, the base station can learn a random number seed and a random number generator of each terminal. For each terminal, the base station generates a random number according to the random number seed and the random number generator of the terminal. A different random number is generated each time. However, during an access process of the terminal, sequences of random numbers generated by the terminal and the base station are the same. In addition, a manner in which the base station determines a first signature according to a random number and a signature matrix is the same as a manner in which a terminal determines a first signature according to a random number and a signature matrix. If selecting a plurality of second signatures at a time, the base station combines, according to a rule that is the same as a preset rule used by the terminal, the plurality of second signatures selected at a time to obtain a first signature.

Step 204. The base station determines a sequence of first signatures, in the sequence of first signatures that is corresponding to each terminal, that is the same as the sequence of third signatures; determines a terminal corresponding to the determined sequence of first signatures as a terminal sending the symbol sequences; and obtains corresponding binary data by parsing, according to the sequence of third signatures, each symbol sequence of the determined terminal.

During implementation, if successfully parsing the received symbol sequences, the base station feeds back an acknowledgment signal to the terminal to notify the terminal that the base station has correctly detected the symbol sequences, that is, contention-based access of the terminal is successful, and the base station instructs the terminal not to transmit a next piece of binary data.

During implementation, parsing the symbol sequences by the base station may be implemented by using a belief propagation algorithm (Belief Propagation algorithm).

In this embodiment, the base station sequentially detects the third signature included in each symbol sequence of the symbol sequences sent by the terminal for a plurality of consecutive times, to obtain the sequence of third signatures, and detects the terminal according to the sequence of third signatures. This avoids a problem that, if a terminal uses a fixed signature, it is impossible or difficult for the base station to perform detection when different terminals use a same signature, thereby improving system efficiency.

Figure 3:
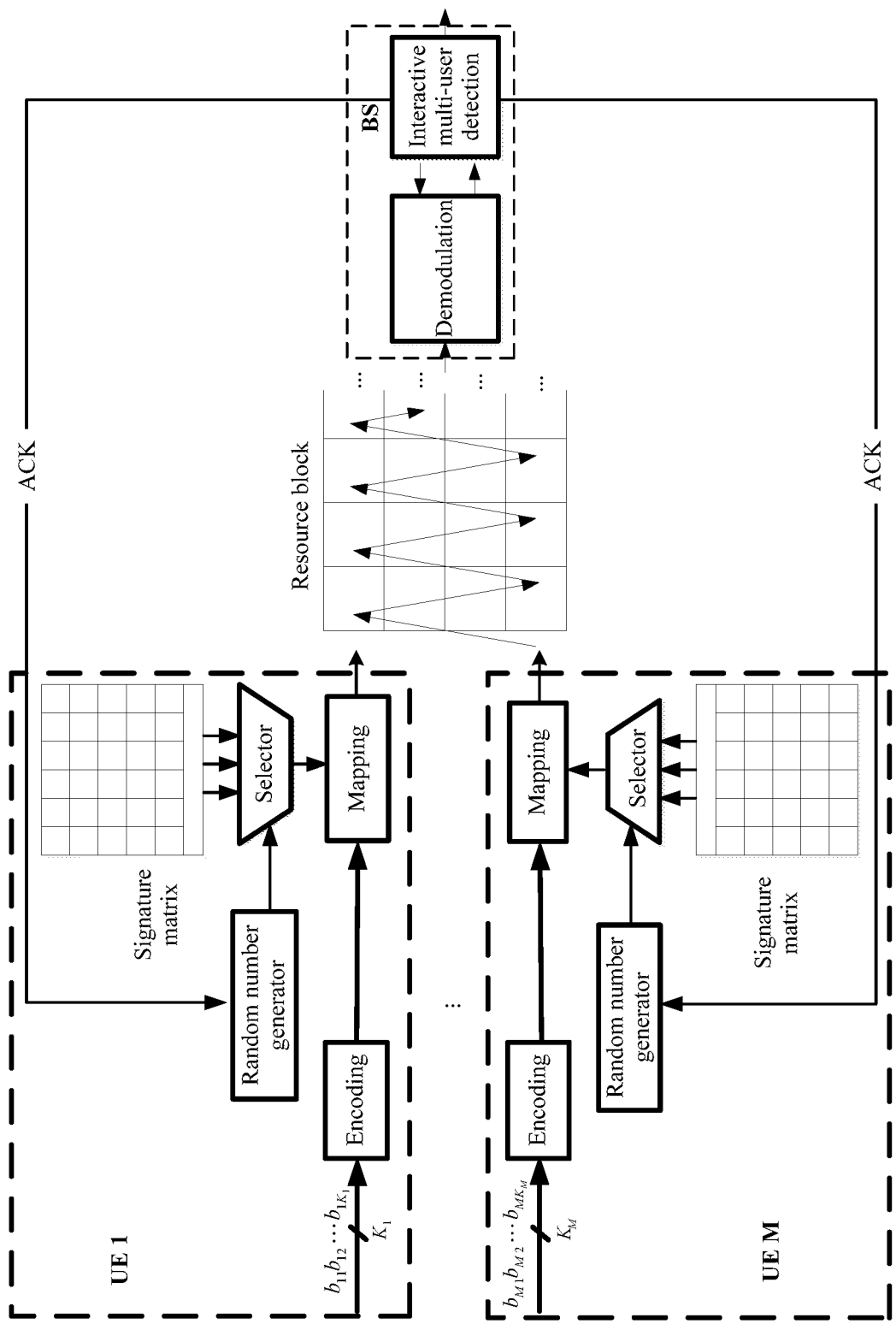
FIG. 3 is a schematic diagram of a system architecture in which multiple terminals access a base station according to an embodiment of the present invention.

FIG. 3 is a schematic diagram of a system architecture in which multiple terminals access a base station. It should be noted that, the system architecture is merely used as an example for description, and the system architecture is an example for describing a logical architecture. UE 1 to UE M access the base station in a contention-based manner, and each UE includes a random number generator (Random Number Generator), an encoder (Encoder), and a mapper (Mapper). The random number generator generates a random number according to a random number seed of the UE, and inputs the random number to a selector. The selector selects a first signature from the signature matrix according to the random number. Alternatively, the selector selects a plurality of second signatures from the signature matrix according to the random number, and combines the plurality of second signatures into a first signature. The selector inputs the first signature to the mapper. The encoder encodes to-be-transmitted data of the UE to obtain aggregate binary data. The mapper obtains a part of binary data from the aggregate binary data in order each time, and maps the binary data to a multi-dimensional symbol according to the first signature. Multi-dimensional symbols of each UE are superposed on a resource block and are transmitted by using the resource block. After demodulating, by using a demodulator (Demodulator), a symbol sequence transmitted by using the resource block, the base station inputs a demodulated symbol sequence to an interactive multi-user detector (Interactive Multi-User Detector), to perform multi-user detection by detecting third signatures carried in symbol sequences, of one terminal, that are obtained for a plurality of consecutive times, so as to determine UE corresponding to the received symbol sequences. If successfully decoding symbol sequences of specific UE, the base station feeds back an ACK signal to the UE.

The following uses a specific embodiment to describe a specific process, in which a terminal accesses a base station in a contention-based manner, provided in an embodiment of the present invention.

Figure 4:
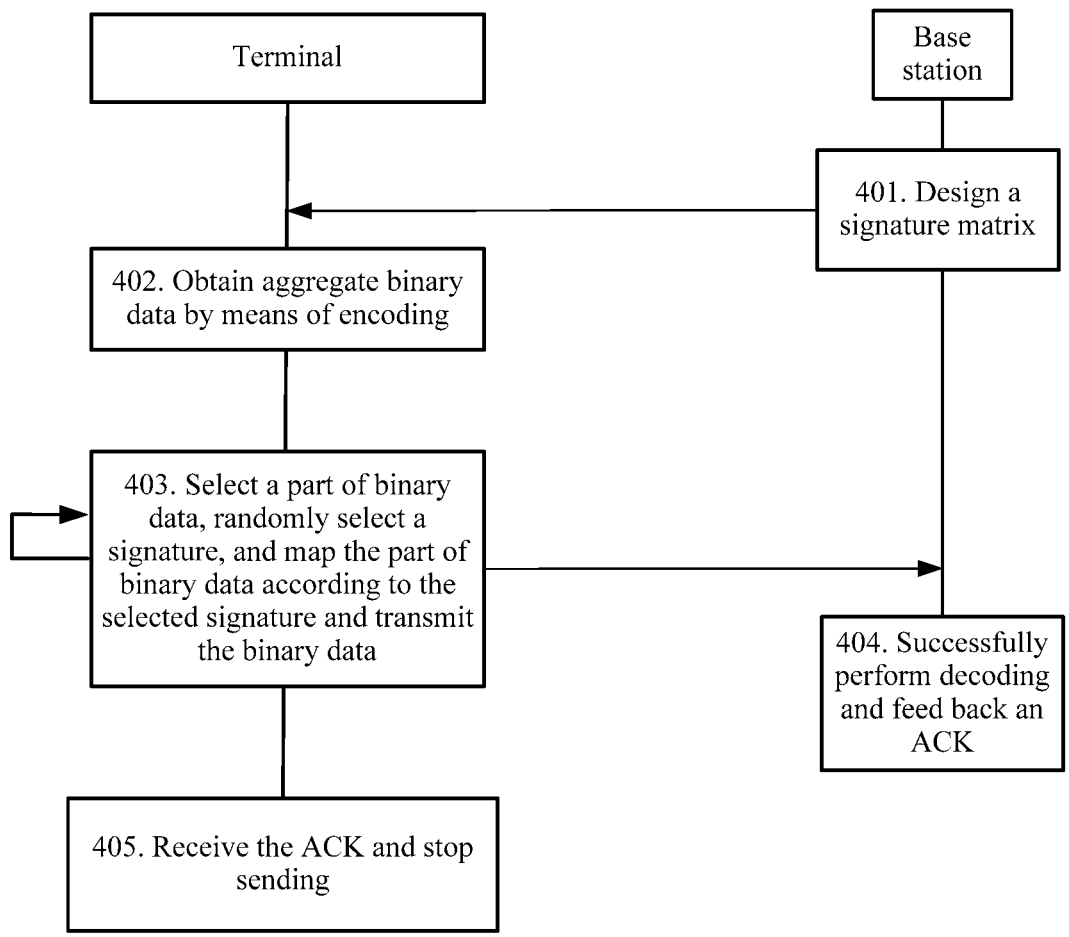
FIG. 4 is a schematic flowchart of interaction between a terminal and a base station in a contention-based access phase according to an embodiment of the present invention.

FIG. 4 is a schematic flowchart of interaction between a terminal and a base station in a contention-based access phase. An interaction process is specifically as follows.

Step 401. A base station determines a signature matrix according to network parameters such as an average status, an average user quantity, and a quality of service (Quality of Service, QoS) requirement, and notifies the signature matrix to a terminal.

Step 402. The terminal encodes data to obtain aggregate binary data.

Step 403. The terminal generates a random number according to a random number seed, determines a first signature by using the random number and the signature matrix, selects a part of binary data from the aggregate binary data in order, and maps, according to the first signature, the selected part of binary data to a multi-dimensional symbol for transmission by using a resource block. Step 403 is repeated.

Step 404. The base station detects signatures from symbol sequences transmitted for a plurality of consecutive times to obtain a sequence of third signatures, where the signatures in the sequence of third sequences are arranged according to a transmission order of the symbol sequences. The base station generates a random number according to a random number seed of each terminal; determines a first signature according to the random number and the signature matrix; executes, for a plurality of times, a process of generating a random number and determining a first signature, to obtain a sequence of first signatures that is corresponding to the terminal; determines a sequence of first signatures, in the sequence of first signatures that is corresponding to each terminal, that is the same as the sequence of third signatures; determines a terminal corresponding to the determined sequence of first signatures as a terminal sending the symbol sequences; and feeds back an ACK signal to the terminal after successfully decoding, according to the sequence of third signatures, the symbol sequences sent by the terminal.

Step 405. The terminal receives the ACK signal fed back by the base station, and determines that contention-based access is successful.

Figure 5:
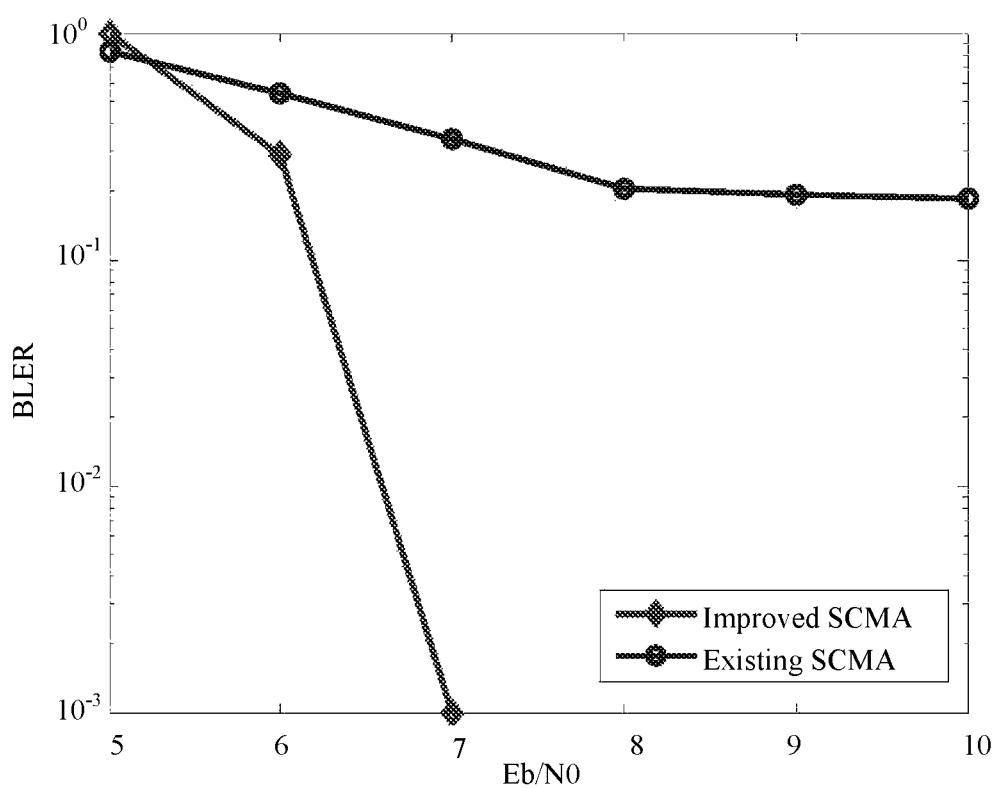
FIG. 5 is a schematic diagram of a simulation result according to an embodiment of the present invention.

FIG. 5 is a schematic diagram of comparison between a simulation result of an existing SCMA access mechanism and a simulation result of an access mechanism mentioned in the embodiments of the present invention. Assuming that a signature matrix includes six signatures, in the existing SCMA access mechanism, a terminal selects two signatures from the six signatures for data transmission, and different terminals often select a same signature, reducing system performance. In the method provided in the embodiments of the present invention, a signature is randomly selected from a signature matrix during each data transmission, basically preventing different terminals from selecting a same signature. A base station achieves relatively good performance in channel estimation and decoding, and system performance is greatly improved.

Figure 6:
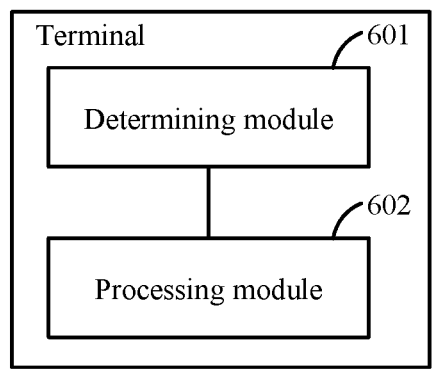
FIG. 6 is a schematic structural diagram of a terminal according to an embodiment of the present invention.

Based on a same inventive idea, an embodiment of the present invention provides a terminal. For a specific implementation of the terminal, refer to the descriptions in the method embodiments. Repeated content is not described herein again. As shown in FIG. 6, the terminal mainly includes:

a determining module 601, configured to determine to enter a contention-based access phase; and a processing module 602, configured to: after the determining module 601 determines to enter the contention-based access phase, during each transmission of binary data, determine a first signature according to a random number seed and a signature matrix, and map, according to the first signature, the binary data to a multi-dimensional symbol for transmission, where first signatures used during different transmissions of binary data are different.

In an optional implementation, the processing module 602 is specifically configured to:

generate a random number according to the random number seed, and randomly select a first signature from the signature matrix according to the random number.

In another optional implementation, the processing module 602 is specifically configured to: generate a random number according to the random number seed, randomly select a plurality of second signatures from the signature matrix according to the random number, and combine the plurality of second signatures into the first signature.

During implementation, the random number seed corresponding to the terminal is different from a random number seed corresponding to another terminal.

During implementation, the processing module 602 is further configured to:

after mapping, according to the first signature, the binary data to the multi-dimensional symbol for transmission, if determining that an acknowledgment signal sent by a base station is received, determine that contention-based access is successful, where the acknowledgment signal is used to indicate that the contention-based access is successful.

Figure 7:
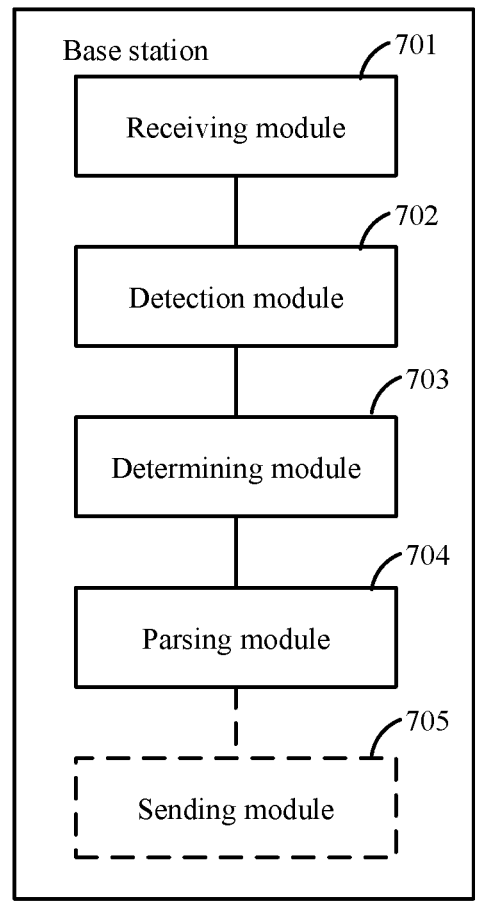
FIG. 7 is a schematic structural diagram of a base station according to an embodiment of the present invention.

Based on a same inventive idea, an embodiment of the present invention further provides a base station. For a specific implementation of the base station, refer to the descriptions in the foregoing method embodiments. Repeated content is not described herein again. As shown in FIG. 7, the base station mainly includes:

a receiving module 701, configured to receive, in a contention-based access phase, symbol sequences sent for a plurality of consecutive times by a terminal;

a detection module 702, configured to sequentially detect a third signature included in each symbol sequence received by the receiving module 701, to obtain a sequence of third signatures;

a determining module 703, configured to determine, according to a random number seed and a signature matrix of each terminal, a sequence of first signatures that is corresponding to each terminal; and a parsing module 704, configured to determine a sequence of first signatures, in the sequence of first signatures that is corresponding to each terminal and that is determined by the determining module 703, that is the same as the sequence of third signatures that is obtained by the detection module 702 by means of detection; determine a terminal corresponding to the determined sequence of first signatures as a terminal sending the symbol sequences; and obtain corresponding binary data by parsing, according to the sequence of third signatures, each symbol sequence of the determined terminal.

In an optional implementation, the determining module 703 is specifically configured to determine a sequence of first signatures that is corresponding to each terminal. A process of determining a sequence of first signatures that is corresponding to a terminal is:

generating random numbers according to the random number seed of the terminal for a plurality of consecutive times, sequentially selecting a first signature from the signature matrix according to each random number, and determining, according to the first signature corresponding to each random number, the sequence of first signatures that is corresponding to the terminal.

In another optional implementation, the determining module 703 is specifically configured to determine a sequence of first signatures that is corresponding to each terminal. A process of determining a sequence of first signatures that is corresponding to a terminal is:

generating random numbers according to the random number seed of the terminal for a plurality of consecutive times; sequentially selecting second signatures from the signature matrix according to each random number, where a plurality of second signatures are selected at a time; combining the plurality of second signatures selected at a time into a first signature; and determining, according to the first signature corresponding to each random number, the sequence of first signatures that is corresponding to the terminal.

During implementation, the base station further includes a sending module 705, configured to:

if the parsing module 704 successfully parses the symbol sequences, feed back an acknowledgment signal to the terminal corresponding to the symbol sequences, where the acknowledgment signal is used to indicate that contention-based access is successful.

Figure 8:
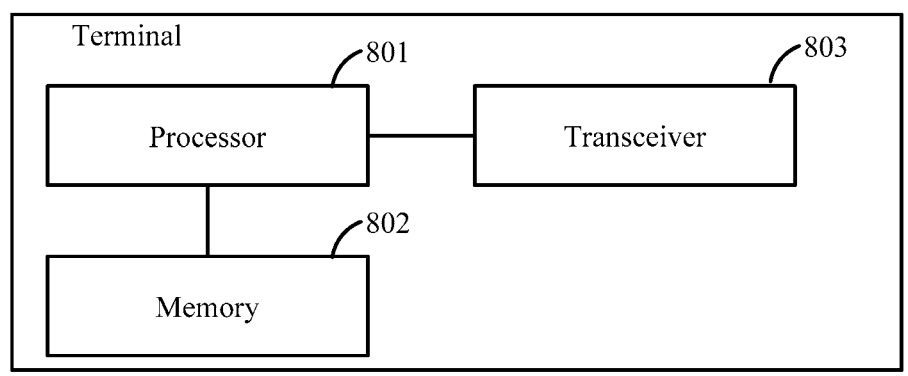
FIG. 8 is a schematic structural diagram of another terminal according to an embodiment of the present invention.

Based on a same inventive idea, an embodiment of the present invention further provides another terminal. For a specific implementation of the terminal, refer to the descriptions in the foregoing method embodiments. Repeated content is not described herein again. As shown in FIG. 8, the terminal mainly includes a processor 801, a memory 802, and a transceiver 803. The transceiver 803 receives and sends data under control of the processor 801. A preset program is stored in the memory 802. The processor 801 reads the program stored in the memory 802 and executes the following process according to the program:

determining to enter a contention-based access phase, during each transmission of binary data, determining a first signature according to a random number seed and a signature matrix, and mapping, according to the first signature, the binary data to a multi-dimensional symbol for transmission, where first signatures used during different transmissions of binary data are different.

In an optional implementation, the processor 801 generates a random number according to the random number seed, and randomly selects a first signature from the signature matrix according to the random number.

In another optional embodiment, the processor 801 generates a random number according to the random number seed, randomly selects a plurality of second signatures from the signature matrix according to the random number, and combines the plurality of second signatures into the first signature.

During implementation, the random number seed corresponding to the terminal is different from a random number seed corresponding to another terminal.

During implementation, after mapping, according to the first signature, the binary data to the multi-dimensional symbol for transmission, if determining that the transceiver 803 receives an acknowledgment signal sent by a base station, the processor 801 determines that contention-based access is successful, where the acknowledgment signal is used to indicate that the contention-based access is successful.

Figure 9:
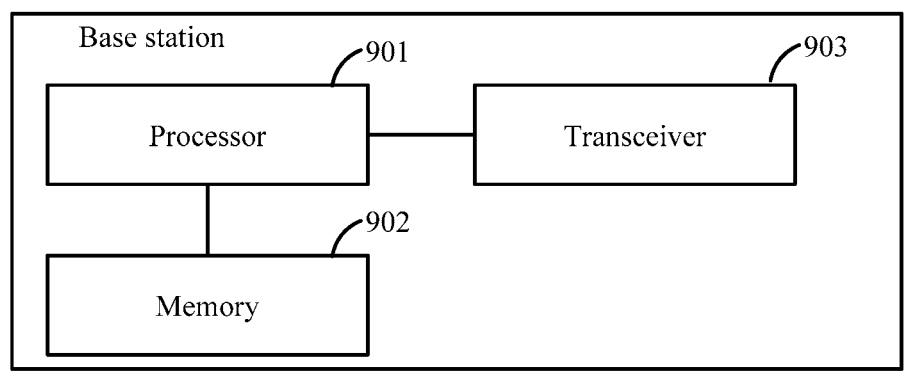
FIG. 9 is a schematic structural diagram of another base station according to an embodiment of the present invention.

Based on a same inventive idea, an embodiment of the present invention further provides another base station. For a specific implementation of the base station, refer to the descriptions in the foregoing method embodiments. Repeated content is not described herein again. As shown in FIG. 9, the base station mainly includes a processor 901, a memory 902, and a transceiver 903. The transceiver 903 receives and sends data under control of the processor 901. A preset program is stored in the memory 902. The processor 901 reads the program stored in the memory 902 and executes the following process according to the program:

receiving, by using the transceiver 903 in a contention-based access phase, symbol sequences sent for a plurality of consecutive times by a terminal;

sequentially detecting a third signature included in each symbol sequence received by the transceiver 903 to obtain a sequence of third signatures;

determining, according to a random number seed and a signature matrix of each terminal, a sequence of first signatures that is corresponding to each terminal; and determining a sequence of first signatures, in the sequence of first signatures that is corresponding to each terminal, that is the same as the sequence of third signatures, determining a terminal corresponding to the determined sequence of first signatures as a terminal sending the symbol sequences, and obtaining corresponding binary data by parsing, according to the sequence of third signatures, each symbol sequence of the determined terminal.

In an optional implementation, the processor 901 determines a sequence of first signatures that is corresponding to each terminal. A process of determining the sequence of first signatures by the processor 901 is as follows: generating random numbers according to the random number seed of the terminal for a plurality of consecutive times; sequentially selecting a first signature from the signature matrix according to each random number; and determining, according to the first signature corresponding to each random number, the sequence of first signatures that is corresponding to the terminal.

In another optional implementation, the processor 901 determines a sequence of first signatures that is corresponding to each terminal. A process of determining the sequence of first signatures by the processor 901 is as follows: generating random numbers according to the random number seed of the terminal for a plurality of consecutive times; sequentially selecting second signatures from the signature matrix according to each random number, where a plurality of second signatures are selected at a time; combining the plurality of second signatures selected at a time into a first signature; and determining, according to the first signature corresponding to each random number, the sequence of first signatures that is corresponding to the terminal.

During implementation, if successfully parsing the symbol sequences, the processor 901 feeds back, by using the transceiver 903, an acknowledgment signal to the terminal corresponding to the symbol sequences, where the acknowledgment signal is used to indicate that contention-based access is successful.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory and an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be loaded onto the computer or the another programmable data processing device, so that a series of operations and steps are performed on the computer or the another programmable device to generate computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the protection scope defined by the following claims of the present invention and their equivalent technologies.

What is claimed is:

1. A terminal access method, comprising:

determining, by a terminal, to enter a contention-based access phase;

determining, by the terminal during each transmission of binary data, a first signature according to a random number seed and a signature matrix; and mapping, by the terminal, according to the first signature, the binary data to a multi-dimensional symbol for transmission, wherein first signatures used during different transmissions of binary data are different; and generating, by the terminal, a random number according to the random number seed, randomly selecting a plurality of second signatures from the signature matrix according to the random number, and combining the plurality of second signatures into the first signature.

2. A terminal access method, comprising:

receiving, by a base station in a contention-based access phase, symbol sequences sent for a plurality of consecutive times by a terminal;

sequentially detecting, by the base station, a third signature comprised in each symbol sequence to obtain a sequence of third signatures;

determining, by the base station according to a random number seed and a signature matrix of each terminal, a sequence of first signatures corresponding to each terminal; and determining, by the base station, a sequence of first signatures, in the sequence of first signatures corresponding to each terminal, that is the same as the sequence of third signatures;

determining a terminal corresponding to the determined sequence of first signatures as a terminal sending the symbol sequences; and obtaining corresponding binary data by parsing, according to the sequence of third signatures, each symbol sequence of the determined terminal.

3. The terminal access method according to claim 2, wherein determining, by the base station according to a random number seed and a signature matrix of each terminal, a sequence of first signatures that is corresponding to each terminal comprises:

generating, by the base station, random numbers according to the random number seed of a terminal for a plurality of consecutive times, sequentially selecting a first signature from the signature matrix according to each random number, and determining, according to the first signature corresponding to each random number, the sequence of first signatures that is corresponding to the terminal.

4. The terminal access method according to claim 2, wherein the determining, by the base station according to a random number seed and a signature matrix of each terminal, a sequence of first signatures that is corresponding to each terminal comprises:

generating, by the base station, random numbers according to the random number seed of a terminal for a plurality of consecutive times;

sequentially selecting second signatures from the signature matrix according to each random number, wherein a plurality of second signatures are selected at a time;

combining the plurality of second signatures selected at a time into a first signature; and determining, according to the first signature corresponding to each random number, the sequence of first signatures that is corresponding to the terminal.

5. The terminal access method according to claim 2, wherein the method further comprises:

if successfully parsing the symbol sequences, feeding back, by the base station, an acknowledgment signal to the terminal corresponding to the symbol sequences, wherein the acknowledgment signal indicates that contention-based access is successful.

6. A terminal, comprising:

a determining module, configured to determine to enter a contention-based access phase; and a processing module, configured to: after the determining module determines to enter the contention-based access phase, during each transmission of binary data, determine a first signature according to a random number seed and a signature matrix, and map, according to the first signature, the binary data to a multi-dimensional symbol for transmission, wherein first signatures used during different transmissions of binary data are different; and generate a random number according to the random number seed, randomly select a plurality of second signatures from the signature matrix according to the random number, and combine the plurality of second signatures into the first signature.

7. A base station, comprising:

a receiving module, configured to receive, in a contention-based access phase, symbol sequences sent for a plurality of consecutive times by a terminal;

a detection module, configured to sequentially detect a third signature comprised in each symbol sequence received by the receiving module, to obtain a sequence of third signatures;

a determining module, configured to determine, according to a random number seed and a signature matrix of each terminal, a sequence of first signatures that is corresponding to each terminal; and a parsing module, configured to determine a sequence of first signatures, in the sequence of first signatures that is corresponding to each terminal and that is determined by the determining module, that is the same as the sequence of third signatures that is obtained by the detection module by means of detection; determine a terminal corresponding to the determined sequence of first signatures as a terminal sending the symbol sequences; and obtain corresponding binary data by parsing, according to the sequence of third signatures, each symbol sequence of the determined terminal.

8. The base station according to claim 7, wherein the determining module is specifically configured to:

generate random numbers according to the random number seed of the terminal for a plurality of consecutive times, sequentially select a first signature from the signature matrix according to each random number, and determine, according to the first signature corresponding to each random number, the sequence of first signatures corresponding to the terminal.

9. The base station according to claim 7, wherein the determining module is further configured to:

generate random numbers according to the random number seed of the terminal for a plurality of consecutive times; sequentially select second signatures from the signature matrix according to each random number, wherein a plurality of second signatures are selected at a time; combine the plurality of second signatures selected at a time into a first signature; and determine, according to the first signature corresponding to each random number, the sequence of first signatures that is corresponding to the terminal.

10. The base station according to claim 7, further comprising a sending module, configured to:

if the parsing module successfully parses the symbol sequences, feed back an acknowledgment signal to the terminal corresponding to the symbol sequences, wherein the acknowledgment signal indicates that contention-based access is successful.

* * * * *